(12) United States Patent
Taghizadeh et al.

(10) Patent No.: US 11,984,965 B2
(45) Date of Patent: May 14, 2024

(54) AUDIO PROCESSING APPARATUS AND METHOD FOR LOCALIZING AN AUDIO SOURCE

(71) Applicants: Huawei Technologies Co., Ltd., Shenzhen (CN); Friedrich-Alexander-Universität Erlangen-Nürnberg, Erlangen (DE)

(72) Inventors: Mohammad Taghizadeh, Munich (DE); Walter Kellermann, Erlangen (DE); Michael Günther, Erlangen (DE); Andreas Brendel, Erlangen (DE)

(73) Assignees: Huawei Technologies Co., Ltd., Shenzhen (CN); Friedrich-Alexander-Universität Erlangen-Nürnberg, Erlangen (DE)

( * ) Notice: Subject to any disclaimer, the term of this patent is extended or adjusted under 35 U.S.C. 154(b) by 280 days.

(21) Appl. No.: 17/496,566

(22) Filed: Oct. 7, 2021

(65) Prior Publication Data
US 2022/0052751 A1    Feb. 17, 2022

Related U.S. Application Data

(63) Continuation of application No. PCT/EP2019/059114, filed on Apr. 10, 2019.

(51) Int. Cl.
*H04R 3/00* (2006.01)
*H04B 7/0426* (2017.01)
*H04B 7/08* (2006.01)

(52) U.S. Cl.
CPC ............ *H04B 7/086* (2013.01); *H04B 7/043* (2013.01); *H04B 7/0434* (2013.01)

(58) Field of Classification Search
CPC ............ H04R 3/0005; H04R 2430/21; H04R 2430/23; H04R 2430/25; H04R 3/005
See application file for complete search history.

(56) References Cited

U.S. PATENT DOCUMENTS

| 2014/0286497 A1 | 9/2014 | Thyssen et al. |
| 2018/0301160 A1 | 10/2018 | Markovic et al. |
| 2020/0388298 A1* | 12/2020 | Koizumi ............. G10L 21/0232 |

OTHER PUBLICATIONS

Ma et al., "Robust Binaural Localization of a Target Sound Source by Combining Spectral Source Models and Deep Neural Networks," IEEE/ACM Transactions on Audio, Speech, and Language Processing, pp. 1-10, Institute of Electrical and Electronics Engineers, New York, New York (Apr. 5, 2019).

(Continued)

*Primary Examiner* — Ping Lee
(74) *Attorney, Agent, or Firm* — Leydig, Voit & Mayer, Ltd.

(57) ABSTRACT

The disclosure relates to an audio processing apparatus for localizing an audio source. The audio processing apparatus comprises a plurality of audio sensors, including a primary audio sensor and at least two secondary audio sensors, configured to detect an audio signal from a target audio source, wherein the primary audio sensor defines at least two pairs of audio sensors with the at least two secondary audio sensors; and processing circuitry configured to: determine for each pair of audio sensors a first set of likelihoods of spatial directions of the target audio source using a first localization scheme; determine a second set of likelihoods of spatial directions of the target audio source using a second localization scheme; and determine a third set of likelihoods of spatial directions of the target audio source on the basis of the first sets of likelihoods and the second set of likelihoods.

19 Claims, 14 Drawing Sheets

(56) References Cited

OTHER PUBLICATIONS

Reindl et al., "Minimum Mutual Information-Based Linearly Constrained Broadband Signal Extraction," IEEE/ACM Transactions on Audio, Speech, and Language Processing, vol. 22, No. 6, pp. 1096-1108, Institute of Electrical and Electronics Engineers, New York, New York (Jun. 2014).

Garofolo et al., "CSR-I (WSJ0) Complete," Linguistic Data Consortium, Philadelphia, Total 3 pages (May 30, 2007).

Schuhmacher et al., "A Consistent Metric for Performance Evaluation of Multi-Object Filters," IEEE Transactions on Signal Processing, vol. 56, No. 8, pp. 3447-3457, Institute of Electrical and Electronics Engineers, New York, New York (Aug. 2008).

Lombard et al., "Multidimensional Localization of Multiple Sound Sources Using Averaged Directivity Patterns of Blind Source Separation Systems," 2009 IEEE International Conference on Acoustics, Speech and Signal Processing, pp. 233-236, Institute of Electrical and Electronics Engineers, New York, New York (Apr. 2009).

Lombard et al., "Synthesis of ICA-Based Methods for Localization of Multiple Broadband Sound Sources," 2011 IEEE International Conference on Acoustics, Speech and Signal Processing, Prague, Czech Republic, pp. 157-160, Institute of Electrical and Electronics Engineers, New York, New York (May 2011).

Lombard et al., "Exploiting the Self-Steering Capability of Blind Source Separation to Localize Two or More Sound Sources in Adverse Environments," ITG Conference on Voice Communication, Aachen, Germany, Total 4 pages, VDE (Oct. 8-10, 2008).

Lombard et al., "Multidimensional Localization of Multiple Sound Sources Using Blind Adaptive MIMO System Identification," 2006 IEEE International Conference on Multisensor Fusion and Integration for Intelligent Systems, Heidelberg, Germany, pp. 7-12, Institute of Electrical and Electronics Engineers, New York, New York (Sep. 3-6, 2006).

* cited by examiner

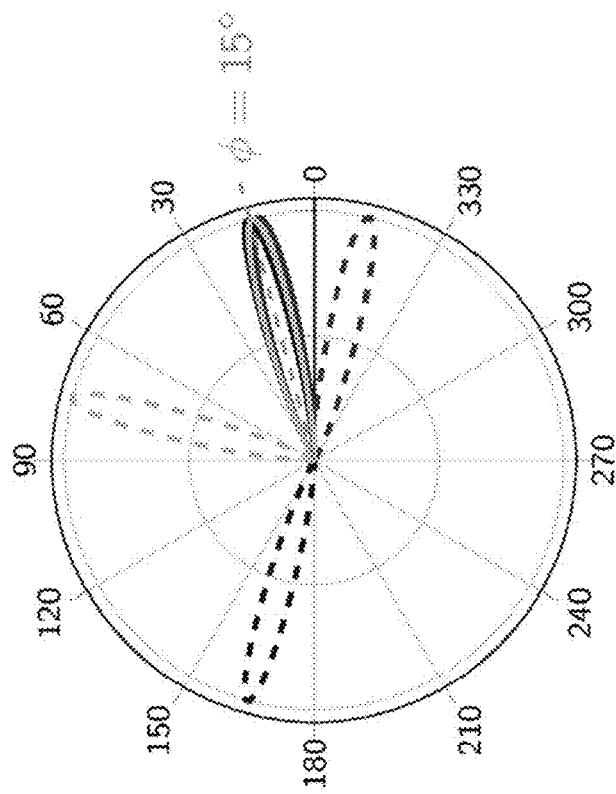
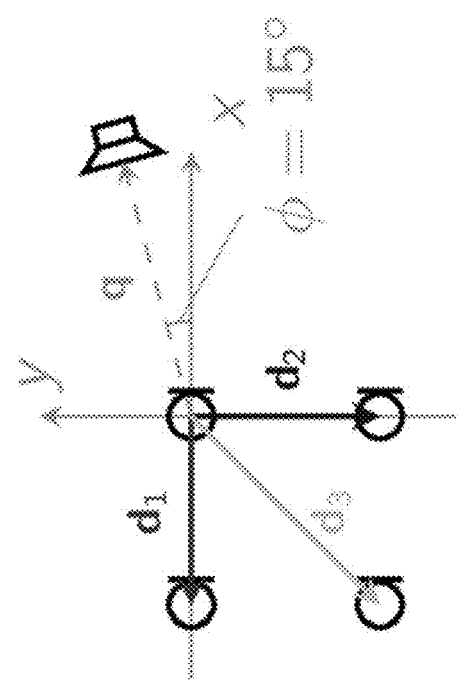
Fig. 2(a)
Fig. 2(b)

(a) Sampled localization function.

(b) Unnormalized DOA likelihood vector. Note the change of coordinate system from Figure 7(a) to Figure 7(b).

(c) DOA likelihood vector after normalization.

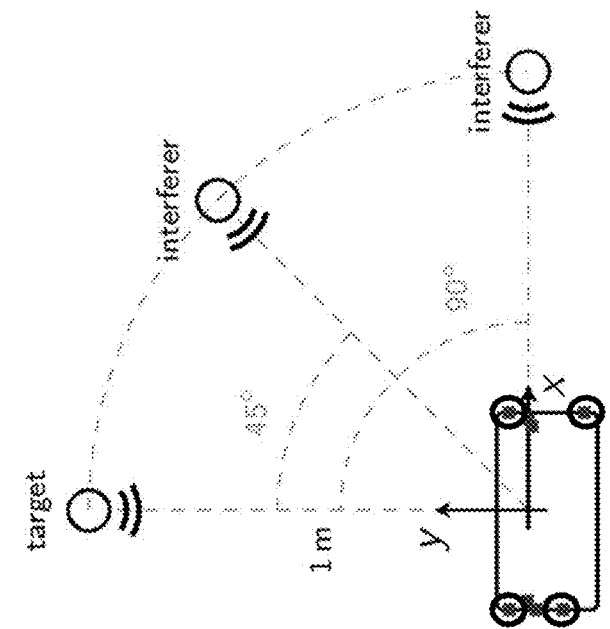
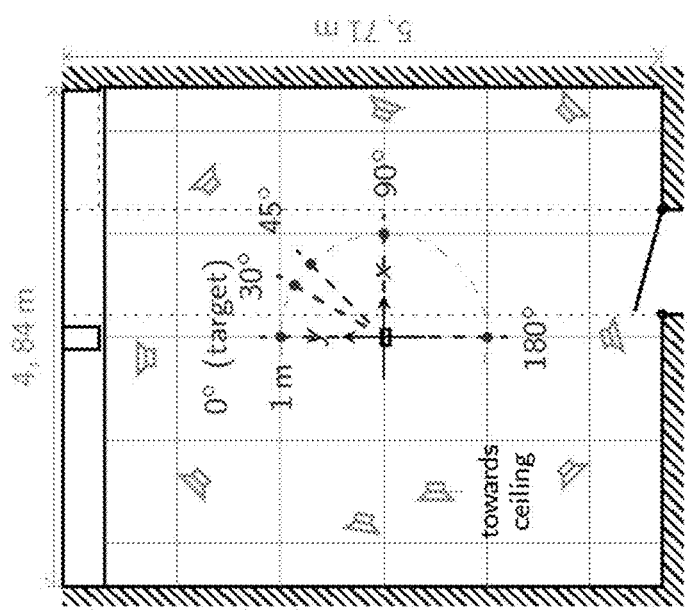
Fig. 10(a)
Fig. 10(b)

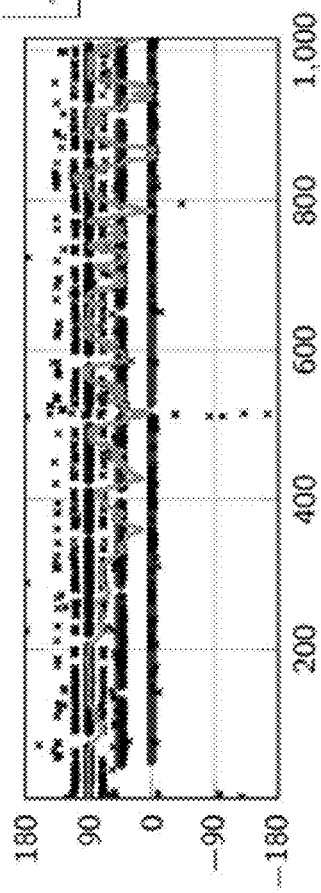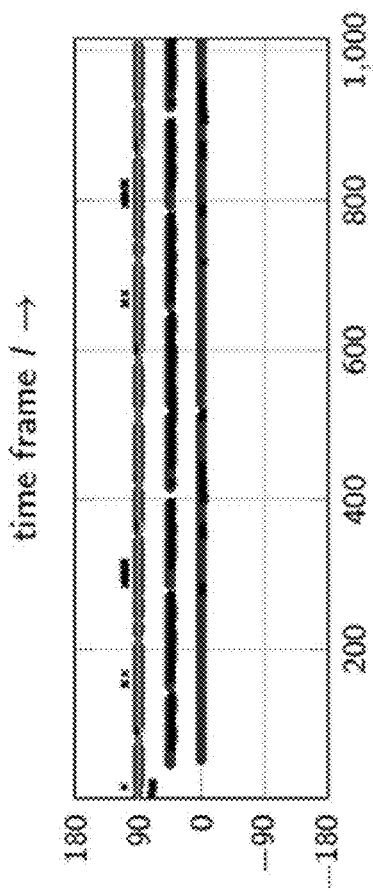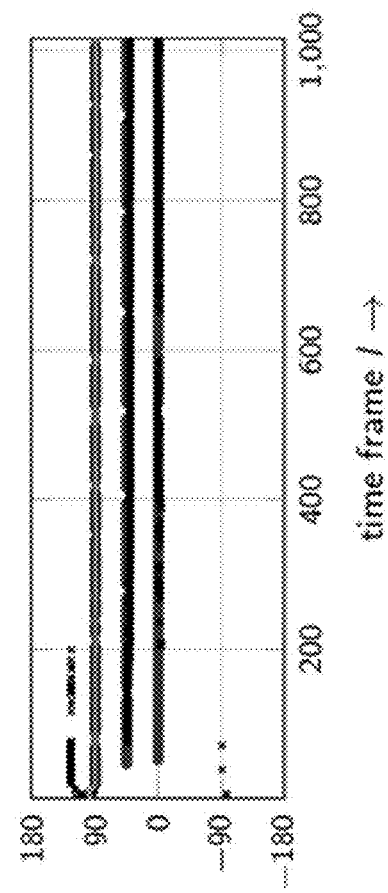

Fig. 13(a) $M_s = 3$

| Scenario | Method | $d_\theta^{(\circ)}$ | $d_{\phi,cand}^{(\circ)}$ | $d_{\phi,sel}^{(\circ)}$ |
|---|---|---|---|---|
| $SNR_{bg} = 30\,dB$ | SRP-PHAT | 46.8 | 36.7 | 17.6 |
| | MT | 46.9 | 37.4 | 12.4 |
| | ADP (mean) | 42.1 | 35.9 | 8.35 |
| | ADP (prod) | 41.9 | 36.4 | 7.38 |
| $SNR_{bg} = 20\,dB$ | SRP-PHAT | 49.6 | 36.6 | 17.4 |
| | MT | 47.4 | 36.4 | 11.6 |
| | ADP (mean) | 42.6 | 35.9 | 8.81 |
| | ADP (prod) | 42.0 | 36.4 | 7.63 |
| $SNR_{bg} = 10\,dB$ | SRP-PHAT | 50.0 | 39.1 | 16.2 |
| | MT | 47.8 | 39.0 | 10.9 |
| | ADP (mean) | 44.2 | 38.5 | 10.6 |
| | ADP (prod) | 42.9 | 38.6 | 8.73 |
| $SNR_{bg} = 0\,dB$ | SRP-PHAT | 52.8 | 40.6 | 16.8 |
| | MT | 49.0 | 40.0 | 11.1 |
| | ADP (mean) | 52.0 | 38.9 | 19.7 |
| | ADP (prod) | 46.2 | 37.2 | 15.1 |
| $SNR_{bg} = -10\,dB$ | SRP-PHAT | 60.6 | 44.7 | 22.5 |
| | MT | 52.6 | 43.8 | 11.3 |
| | ADP (mean) | 72.3 | 60.0 | 26.3 |
| | ADP (prod) | 69.2 | 57.9 | 22.1 |

Fig. 13(b) $M_s = 2$

| Scenario | Method | $d_\theta^{(\circ)}$ | $d_{\phi,cand}^{(\circ)}$ | $d_{\phi,sel}^{(\circ)}$ |
|---|---|---|---|---|
| $SNR_{bg} = 30\,dB$ | SRP-PHAT | 49.1 | 40.9 | 10.7 |
| | MT | 41.1 | 36.3 | 5.12 |
| | ADP (mean) | 46.8 | 45.4 | 2.35 |
| | ADP (prod) | 42.2 | 40.7 | 2.09 |
| $SNR_{bg} = 20\,dB$ | SRP-PHAT | 48.9 | 40.8 | 10.3 |
| | MT | 41.9 | 38.1 | 4.2 |
| | ADP (mean) | 47.5 | 46.1 | 2.42 |
| | ADP (prod) | 42.2 | 40.8 | 2.16 |
| $SNR_{bg} = 10\,dB$ | SRP-PHAT | 47.0 | 39.0 | 10.2 |
| | MT | 42.9 | 39.3 | 3.97 |
| | ADP (mean) | 50.9 | 49.0 | 3.06 |
| | ADP (prod) | 43.1 | 41.7 | 2.32 |
| $SNR_{bg} = 0\,dB$ | SRP-PHAT | 51.7 | 43.3 | 11.2 |
| | MT | 43.7 | 40.3 | 3.56 |
| | ADP (mean) | 65.4 | 63.1 | 4.69 |
| | ADP (prod) | 51.1 | 49.6 | 3.88 |
| $SNR_{bg} = -10\,dB$ | SRP-PHAT | 61.3 | 46.2 | 19.0 |
| | MT | 51.5 | 45.6 | 6.97 |
| | ADP (mean) | 75.9 | 70.6 | 14.8 |
| | ADP (prod) | 76.2 | 70.1 | 15.6 |

AUDIO PROCESSING APPARATUS AND METHOD FOR LOCALIZING AN AUDIO SOURCE

CROSS-REFERENCE TO RELATED APPLICATIONS

This application is a continuation of International Application No. PCT/EP2019/059114, filed on Apr. 10, 2019, the disclosure of which is hereby incorporated by reference in its entirety.

TECHNICAL FIELD

Embodiments of the present disclosure relate to audio processing. More specifically, the embodiments relate to an audio processing apparatus and method for localizing one or more audio sources.

BACKGROUND

Blind source separation (BSS) is a technique for separating of a set of audio source signals from a set of mixed audio signals, without the aid of information about the audio source signals or the mixing process. A conventional BSS-based signal extraction front end, namely the "Geometrically Constrained TRIple-N Independent component analysis for CONvolutive mixtures (GC-TRINICON)"-based system is described in K. Reindl, S. Meier, H. Barfuss, and W. Kellermann, "Minimum mutual information-based linearly constrained broadband signal extraction", IEEE Transactions on Audio, Speech, and Language Processing, 22(6): 1096-1108, June 2014. In this conventional BSS system, the spatial information provided by $N_M > 2$ audio sensors, e.g. microphones, is exploited by forming pairs of microphones, e.g., between a common reference channel and each remaining channel, resulting in $N_Q = N_M - 1$ pairs, which facilitates exploiting the self-steering capabilities of BSS systems for localization, as described in A. Lombard, T. Rosenkranz, H. Buchner, and W. Kellermann. "Exploiting the self-steering capability of blind source separation to localize two or more sound sources in adverse environments", ITG Conference on Speech Communication, pages 1-4 VDE, 2008. Each microphone pair, however, is affected by the so-called "front-back ambiguity", i.e., audio sources impinging from the front and back half-plane of the sub-array cannot be distinguished if the recorded signals exhibit the same phase difference.

Localization using Averaged Directivity Pattern (ADP), as disclosed, for instance, in A. Lombard, T. Rosenkranz, H. Buchner, and W. Kellermann, "Multidimensional localization of multiple sound sources using averaged directivity patterns of blind source separation systems", Acoustics, Speech and Signal Processing, 2009 IEEE International Conference on, pages 233-236, IEEE, 2009 and A. Lombard, Y. Zheng, and W. Kellermann, "Synthesis of ICA-based methods for localization of multiple broadband sound sources", Acoustics, Speech and Signal Processing, 2011 IEEE International Conference on, pages 157-160, Prague, Czech Republic, May 2011 exploits the self-steering capabilities of BSS systems to localize audio sources by interpreting the demixing system as a set of spatial nullformers. The computation of the ADP can be formulated as a two-step procedure, depicted schematically in FIG. 1 for a 2×2 demixing system based on a geometrically constrained BSS algorithm. The first step consists of computing a frequency-dependent directivity pattern per output of the demixing system. Subsequent averaging over frequency and outputs produces a localization function which exhibits minima at the source positions. FIG. 1 actually depicts a variant referred to as simplified Modified ADP (sMADP), as disclosed in A. Lombard, Y. Zheng, and W. Kellermann, "Synthesis of ICA-based methods for localization of multiple broadband sound sources", Acoustics, Speech and Signal Processing, 2011 IEEE International Conference on, pages 157-160, Prague, Czech Republic, May 2011, which includes the application of a nonlinear contrast function to the directivity patterns before the averaging to enhance the sharpness of the extrema.

As mentioned above, for a synergistic embedding of the ADP localization in the BSS front end described above, only 2×2 BSS systems are considered such that the demixing filters of the Blocking Matrix (BM) can also be exploited for localization. To this end, knowledge of the microphone positions and therefore the orientation of each two-element sub-array is assumed. While 3D localization with ADP using TRIple-N Independent component analysis for CONvolutive mixtures (TRINICON) is in principle possible, as described in A. Lombard, H. Buchner, and W. Kellermann, "Multidimensional localization of multiple sound sources using blind adaptive MIMO system identification", Multi-sensor Fusion and Integration for Intelligent Systems, 2006 IEEE International Conference on, pages 7-12. IEEE, 2006, the following will focus on the azimuthal plane, i.e., the computation of the azimuth angle $\phi$ only.

Localization algorithms which exploit phase differences between only two microphone channels are usually susceptible to front-back ambiguity, meaning that sources impinging on the array from different half planes with respect to the array axis cannot be distinguished since they produce identical phase differences. This phenomenon is illustrated in FIGS. 2(a) and 2(b) for an exemplary array consisting of four microphones arranged in a square configuration. Note the symmetry of the peaks for each microphone pair in FIG. 2(b) with respect to the corresponding microphone difference vector in FIG. 2(a).

When multiple two-element sub-arrays, i.e., microphone pairs, are available, several approaches to fusing their localization information are possible. One possibility is to extract the source positions by detecting the peaks in the localization functions of each microphone pair, and search for matching peaks among in the localization functions of all other pairs using the knowledge of the microphone positions. However, since the localization function is still ambiguous at this point, the number of suspected sources may be as large as twice the actual number of sources, because each source could be located in either half-plane. Furthermore, the number of detected sources may also vary between sub-arrays. In that case, some sources will have no counterpart in other sub-arrays, further complicating the data association. If many microphones and sources are considered, the computational complexity of iterating through all possible permutations can quickly render this approach infeasible. For certain microphone and source configurations, the ambiguity resolution based solely on ADP may even be impossible as illustrated in FIG. 3.

Trying to resolve the ambiguity described above by a straightforward combination of multiple pair-wise localization results, e.g., by averaging the localization functions, may work in simple scenarios as shown in FIG. 2(b), but fails in more complicated cases as depicted in FIG. 3. The extraction of peaks corresponding to sources from the localization functions and subsequent data association requires a-priori knowledge of the number of sources. The number of sources may further vary between different microphone pairs, posing additional challenges. Furthermore, as the number of microphones and/or sources increases, the computational load of data association between different microphone pairs by exhaustive search quickly becomes overwhelming as for each peak its "similarity" with every other peak in every other microphone pair must be evaluated.

Thus, in light of the above, there is a need for an improved audio processing apparatus and method for localizing one or more audio sources, which address one or more of the shortcomings of the prior art described above.

SUMMARY

It is an object of the disclosure to provide an improved audio processing apparatus and method for localizing one or more audio sources, which address one or more of the shortcomings of the prior art described above.

The foregoing and other objects are achieved by the subject matter of the independent claims. Further implementation forms are apparent from the dependent claims, the description and the figures.

Generally, embodiments of the disclosure are based on the idea of incorporating supplemental localization information in a BSS system for localizing one or more audio sources. According to embodiments of the disclosure an ADP-based localization is combined with a supplemental localization based on an arbitrary Direction Of Arrival (DOA) feature, as long as it is immune to front-back ambiguity such as a steered-response power phase transform (SRP-PHAT) scheme.

More specifically, according to a first aspect, the disclosure relates to an audio processing apparatus, comprising: a plurality of spatially separated audio sensors, including a primary reference audio sensor and at least two secondary audio sensors, configured to detect an audio signal from a target audio source, wherein the primary audio sensor defines at least two pairs of audio sensors with the at least two secondary audio sensors; and a processing circuitry. The processing circuitry is configured to: determine for each pair of audio sensors a first set of likelihoods of spatial directions of the target audio source relative to the audio processing apparatus using a first localization scheme; determine a second set of likelihoods of spatial directions of the target audio source relative to the audio processing apparatus using a second localization scheme different from the first localization scheme; and determine a third set of likelihoods of spatial directions of the target audio source relative to the audio processing apparatus on the basis of the first sets of likelihoods of spatial directions and the second set of likelihoods of spatial directions. As used herein, the likelihood of a given spatial direction of the target source is a measure of how likely or probable it is that the position of the target source is in the given spatial direction relative to the audio processing apparatus. In an implementation form, the first, second and third sets of likelihoods of spatial directions of the target audio source can be represented as a respective DOA likelihood vector. As will be appreciated, the first, second and third sets of likelihoods of spatial directions of the target audio source relative to the audio processing apparatus can be considered as a discrete representation of a respective continuous likelihood distribution.

Thus, an improved audio processing apparatus is provided allowing to resolve the front-back ambiguity individually per audio sensor pair in an efficient manner.

In a further embodiment form of the first aspect, the processing circuitry is further configured to determine a current spatial direction of the target audio source relative to the audio processing apparatus on the basis of the third set of likelihoods of spatial directions of the target audio source relative to the audio processing apparatus by determining the most likely spatial direction defined by the third set of likelihoods of spatial directions of the target audio source. Advantageously, this allows determining the actual current spatial direction of the target audio source relative to the audio processing apparatus in an efficient manner without being affected by the front-back ambiguity.

In a further embodiment form of the first aspect, the plurality of audio sensors are further configured to detect a further audio signal from at least one further audio source and wherein the processing circuitry is configured to separate the audio signal of the target audio source from the further audio signal of the further audio source using a blind source separation scheme. In an implementation form the processing circuitry is configured to separate the audio signal of the target audio source from the further audio signal of the further audio source on the basis of the current spatial direction of the target audio source using a blind source separation scheme to ensure the identity of the extracted source. Advantageously, this allows for an improved separation of the audio signal of the target audio source from the further audio signal of the further audio source.

In a further embodiment form of the first aspect, the processing circuitry is configured to separate the audio signal of the target audio source from the further audio signal of the further audio source using a Geometrically Constrained TRIple-N Independent component analysis for CONvolutive mixtures, GC-TRINICON, scheme based on a geometric constraint, wherein the processing circuitry is configured to determine the geometric constraint on the basis of the first sets of likelihoods and the second set of likelihoods of spatial directions of the target audio source and/or the current spatial direction of the target audio source. Advantageously, this allows for an efficient separation of the audio signal of the target audio source from the further audio signal of the further audio source. In a GC-TRINICON scheme a GC-TRINICON blocking matrix in the signal extraction system employs two, i.e. a pair of microphone channels in each unit, thereby leading to an underdetermined scenario if more than two audio sources are present. In this case, the knowledge of the current spatial direction of the target source relative to the audio processing apparatus can be used advantageously to ensure the correct identity of the extracted source.

In a further embodiment form of the first aspect, the processing circuitry is further configured to apply a post filter to the audio signal of the target audio source separated from the further audio signal of the further audio source, wherein the post filter is a coherent-to-diffuse power ratio based post filter based on a target coherence model and/or a noise coherence model and wherein the processing circuitry is configured to determine the target coherence model and/or the noise coherence model on the basis of the first sets of likelihoods and the second set of likelihoods of spatial directions of the target audio source and/or the current spatial direction of the target audio source. Advantageously, this allows providing an improved extracted audio signal of the target audio source.

In a further embodiment form of the first aspect, the first localization scheme is a localization scheme based on a blind source separation, in particular a geometrically constrained triple-n independent component analysis for convolutive mixtures, GC-TRINICON, scheme, in particular a set of demixing filters of the GC-TRINICON scheme.

Advantageously, this allows making synergistic use of the blind source separation scheme for providing the first sets of likelihoods and for extracting the audio signal of the target audio source.

In a further embodiment form of the first aspect, the second localization scheme is a steered-response power phase transform, SRP-PHAT, scheme. Advantageously, the SRP-PHAT scheme provides robust results for the second set of likelihoods without being affected by the front-back ambiguity.

In a further embodiment form of the first aspect, for determining the third set of likelihoods the processing circuitry is configured to determine for each pair of audio sensors a set of similarity weights on the basis of the first set of likelihoods of the respective pair of audio sensors and the second set of likelihoods, wherein each similarity weight represents a similarity measure value between the respective first set of likelihoods and the second set of likelihoods in a respective spatial direction relative to the audio processing apparatus and neighbouring spatial directions thereof. In an implementation form, the set of similarity weights can be represented as a normalized or unnormalized weight vector.

In a further embodiment form of the first aspect, the processing circuitry is configured to determine for a respective pair of audio sensors the respective similarity measure value between the respective first set of likelihoods and the second set of likelihoods in a respective spatial direction and neighbouring spatial directions thereof using a spatial filter, in particular a von Hann window centered on the respective spatial direction relative to the audio processing apparatus. In an implementation form, the processing circuitry is configured to determine a respective component of the weight vector, i.e., the respective similarity measure value in a given spatial direction by determining a scalar product of the DOA likelihood vector defined by a respective first set of likelihoods and the DOA likelihood vector defined by the second set of likelihoods weighted by a spatial filter, in particular a von Hann window centered on the given spatial direction relative to the audio processing apparatus.

In a further embodiment form of the first aspect, for determining the third set of likelihoods the processing circuitry is further configured for each pair of audio sensors to weight the likelihoods of the respective first set of likelihoods with the respective set of similarity weights for obtaining a respective first set of weighted likelihoods. In an implementation form, the processing circuitry is configured to weight each element of a DOA likelihood vector defined by a respective first set of likelihoods with the corresponding element of the weight vector for determining the weighted DOA likelihood vector corresponding to the respective first set of weighted likelihoods.

In a further embodiment form of the first aspect, for determining the third set of likelihoods the processing circuitry is further configured to combine the first sets of weighted likelihoods of all pairs of audio sensors.

In a further embodiment form of the first aspect, the processing circuitry is configured to combine the first sets of weighted likelihoods of all pairs of audio sensors by determining a sum of the first sets of weighted likelihoods of all pairs of audio sensors or a product of the first sets of weighted likelihoods of all pairs of audio sensors. In an implementation form, the processing circuitry is configured to determine the DOA likelihood vector corresponding to the third set of likelihoods by determining a sum or a product of the weighted DOA likelihood vectors corresponding to the first sets of weighted likelihoods of all pairs of audio sensors.

In a further embodiment form of the first aspect, the processing circuitry is configured to determine for each pair of audio sensors the first set of likelihoods of spatial directions of the target audio source as a first direction-of-arrival, DOA, likelihood vector having a plurality of components and the second set of likelihoods of spatial directions of the target audio source as a second DOA likelihood vector having a plurality of components, wherein the components of the first DOA likelihood vector are defined by the respective value of an averaged directivity pattern, ADP, localization function at a plurality of sampled directions and wherein the components of the second DOA likelihood vector are defined by the respective value of a further localization function at the plurality of sampled directions.

According to a second aspect, the disclosure relates to an audio processing method, comprising the steps of: detecting an audio signal from a target audio source by a plurality of spatially separated audio sensors, including a primary reference audio sensor and at least two secondary audio sensors, wherein the primary audio sensor defines at least two pairs of audio sensors with the at least two secondary audio sensors; determining for each pair of audio sensors a first set of likelihoods of spatial directions of the target audio source relative to the audio processing apparatus using a first localization scheme; determining a second set of likelihoods of spatial directions of the target audio source relative to the audio processing apparatus using a second localization scheme different from the first localization scheme; and determining a third set of likelihoods of spatial directions of the target audio source relative to the audio processing apparatus on the basis of the first sets of likelihoods of spatial directions of the target audio source and the second set of likelihoods of spatial directions of the target audio source.

Thus, an improved audio processing method is provided allowing to resolve the front-back ambiguity individually per audio sensor pair in an efficient manner.

The audio processing method according to the second aspect of the disclosure can be performed by the audio processing apparatus according to the first aspect of the disclosure. Further features of the audio processing method according to the second aspect of the disclosure result directly from the functionality of the audio processing apparatus according to the first aspect of the disclosure and its different implementation forms described above and below.

According to a third aspect, the disclosure relates to a computer program product comprising a non-transitory computer-readable storage medium carrying program code which causes a computer or a processor to perform the method according to the second aspect when the program code is executed by the computer or the processor.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which:

FIGS. 2(a) and 2(b) illustrate the front-back ambiguity for a conventional BSS system with an exemplary four-element microphone array;

FIGS. 10(a) and 10(b) illustrate an exemplary experimental setup for testing the performance of an audio processing apparatus according to an embodiment;

FIGS. 11(a), 11(b) and 11(c) illustrate performance results of an audio processing apparatus according to an embodiment;

FIGS. 13(a) and 13(b) show tables illustrating further performance results of an audio processing apparatus according to an embodiment.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of examples, specific aspects of embodiments of the disclosure or specific aspects in which embodiments of the disclosure may be used. It is understood that embodiments of the disclosure may be used in other aspects and comprise structural or logical changes not depicted in the figures. The following detailed description, therefore, is not to be taken in a limiting sense, and the scope of the disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
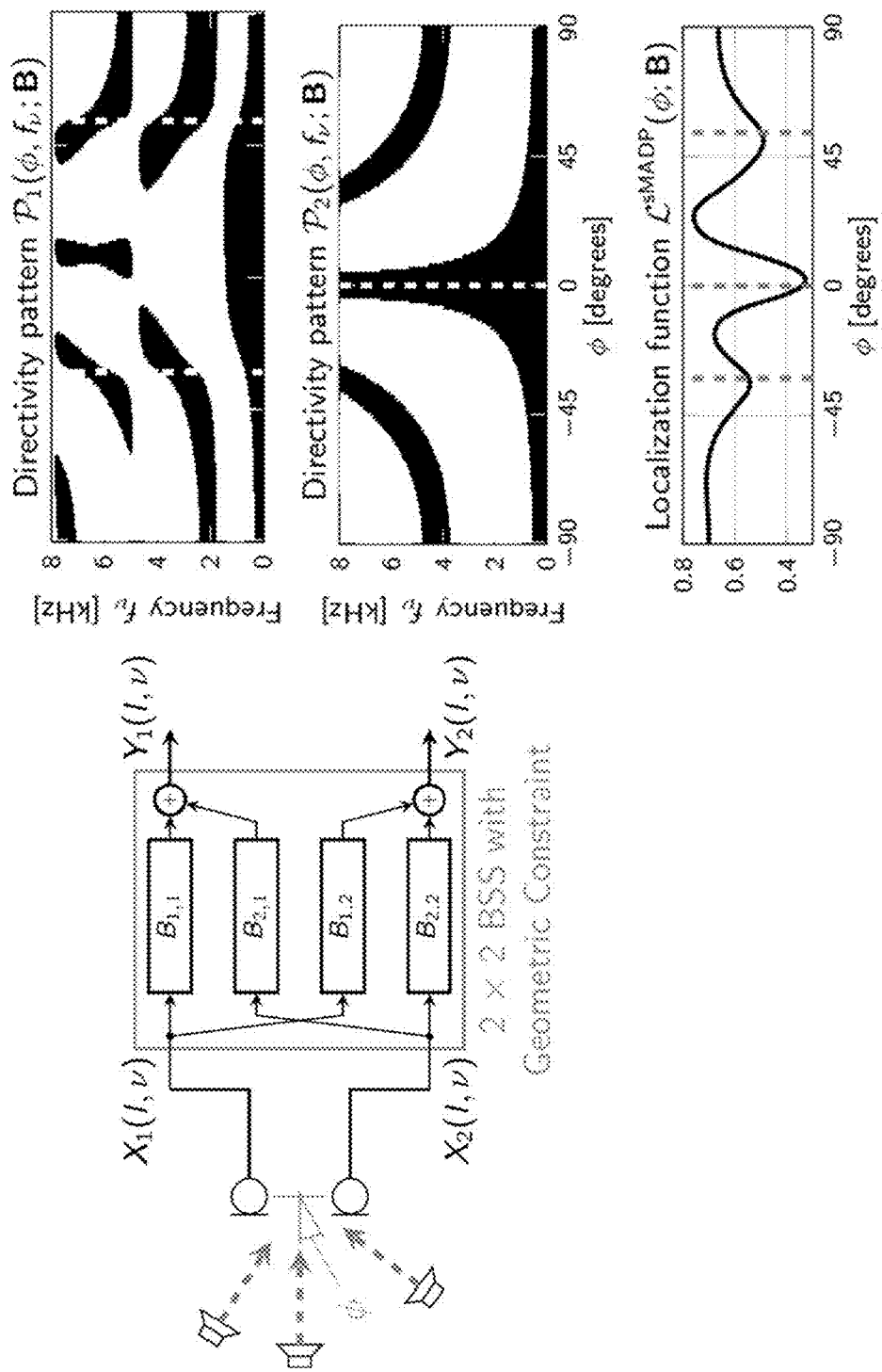
FIG. 1 is a schematic diagram illustrating the computation of an ADP localization function in an underdetermined scenario using a conventional BSS system.
Figure 3:
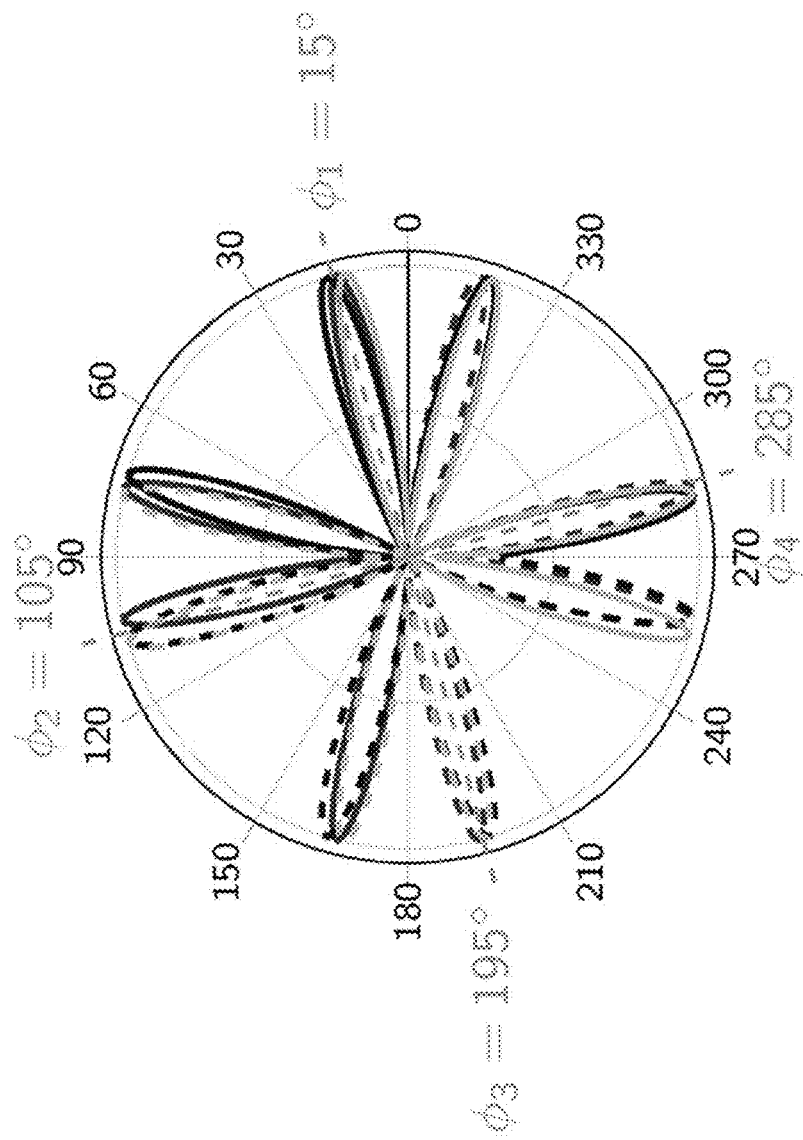
FIG. 3 illustrates the ambiguous localization results obtained for each of the audio sensor sub-arrays shown in FIG. 2a for four audio sources.
Figure 4:
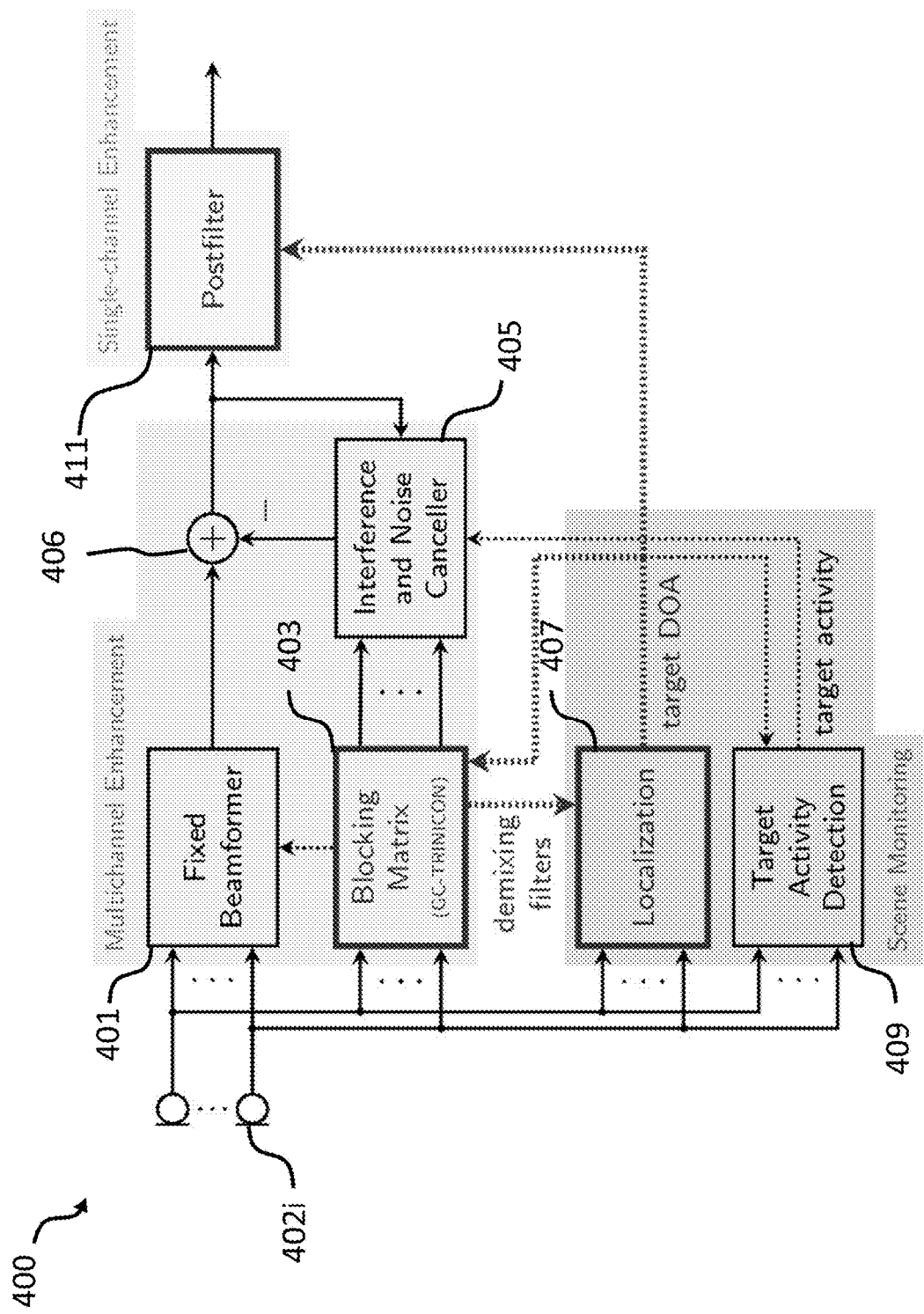
FIG. 4 is a schematic diagram illustrating the architecture of an audio processing apparatus according to an embodiment.

FIG. 4 is a schematic diagram illustrating an audio processing apparatus 400 according to an embodiment. The audio processing apparatus 400 is based on a BSS-based signal extraction front end, in particular the "Geometrically Constrained TRIple-N Independent component analysis for CONvolutive mixtures (GC-TRINICON)"-based system as described in K. Reindl, S. Meier, H. Barfuss, and W. Kellermann, "Minimum mutual information-based linearly constrained broadband signal extraction", IEEE Transactions on Audio, Speech, and Language Processing, 22(6): 1096-1108, June 2014. A GC-TRINICON-based system generally comprises a blocking matrix (BM) configured to model statistically independent source signals and to add one or more geometric constraints to infer a noise estimate and to suppress the target source. Based on this noise estimate a plurality of time-variant noise reduction filters are estimated to suppress residual interferer and noise components in the beamformer output. According to an embodiment, the audio processing apparatus 400 could be implemented, for instance, as a component of a mobile phone.

As illustrated in FIG. 4, the audio processing apparatus 400 comprises a plurality of spatially separated audio sensors, e.g., microphones 402i including a primary reference audio sensor and at least two secondary audio sensors. Each of the audio sensors 402i is configured to detect an audio signal from a target audio source, wherein the primary audio sensor defines at least two pairs of audio sensors with the at least two secondary audio sensors.

In the embodiment illustrated in FIG. 4, the audio processing apparatus 400 implementing a GC-TRINICON based system further comprises a fixed beamfomer unit 401, a blocking matrix unit 403, an interference and noise canceller 405, a combiner 406, a localization unit 407, a target activity detection unit 409 and a postfilter 411. According to an embodiment, the fixed beamformer unit 401, the blocking matrix unit 403, the interference and noise canceller 405 and the combiner 406 form a Generalized Sidelobe Canceller (GSC), which is a particular realization of an Minimum Variance Distortionless Response (MVDR) beamformer known to the person skilled in the art. Moreover, the postfilter 411 can be a coherent-to-diffuse power ratio based post filter based on a target coherence model and a noise coherence model. As the basic functionality of these components of the audio processing apparatus 400 implementing a GC-TRINICON based system is known to the person skilled in the art, the following description of embodiments of the disclosure will focus on the differences between the audio processing apparatus 400 and a conventional GC-TRINICON based system.

Generally, the audio processing apparatus 400 comprises processing circuitry configured to: determine for each pair of audio sensors 402i a first set of likelihoods of spatial directions of the target audio source relative to the audio processing apparatus 400 using a first localization scheme; determine a second set of likelihoods of spatial directions of the target audio source relative to the audio processing apparatus 400 using a second localization scheme different from the first localization scheme; and determine a third set of likelihoods of spatial directions of the target audio source relative to the audio processing apparatus 400 on the basis of the first sets of likelihoods of spatial directions and the second set of likelihoods of spatial directions. In an embodiment, the first localization scheme is a localization scheme based on a blind source separation, in particular a GC-TRINICON scheme. In an embodiment, the second localization scheme is the SRP-PHAT scheme.

As used herein, the likelihood of a given spatial direction of the target source is a measure of how likely or probable it is that the position of the target source is in the given spatial direction relative to the audio processing apparatus 400. As will be appreciated, the first, second and third sets of likelihoods of spatial directions of the target audio source can be considered as a discrete representation of a respective continuous likelihood distribution.

In an embodiment, the processing circuitry of the audio processing apparatus 400 is further configured to determine the actual current spatial direction of the target audio source relative to the audio processing apparatus 400 on the basis of the third set of likelihoods of spatial directions of the target audio source relative to the audio processing apparatus 400 by determining the most likely spatial direction, i.e., the spatial direction having the largest likelihood of the third set of likelihoods of the spatial directions of the target audio source relative to the audio processing apparatus 400.

It is important to note that whereas the respective first set of likelihoods of spatial directions of the target audio source relative to the audio processing apparatus 400 is determined for each pair of audio sensors 402$i$, the second set of likelihoods of spatial directions is determined for the whole set of audio sensors 402$i$. As will be described in more detail below, according to an embodiment, the respective first set of likelihoods of spatial directions and the second set of likelihoods of spatial directions can be defined by a respective first DOA likelihood vector and a second DOA likelihood vector.

Thus, the audio processing apparatus 400 advantageously is configured to make use of further information, namely the second set of likelihoods of spatial directions of the target audio source relative to the audio processing apparatus 400 for resolving the ambiguity inherent to the first sets of likelihoods of spatial directions determined for each pair of audio sensors 402$i$. This is illustrated in more detail in FIG. 5, where the lower processing block 510 represents an ADP-based localization scheme, while the upper processing block 500 represents a supplemental localization scheme based on an arbitrary DOA feature, as long as it is immune to front-back ambiguity such as SRP-PHAT. As will be described in more detail below, the processing block 500 comprises a DOA feature processing block 501 configured to process the audio sensor signals into a DOA likelihood vector, i.e. the second set of likelihoods of spatial directions, a recursive update processing block 503 configured to generate averaged DOA likelihood vectors and a quantile-based detection processing block 505 configured to determine the third set of likelihoods of spatial directions of the target audio source. The processing block 510 comprises a BSS processing block 511 configured to determine demixing filters on the basis of the audio sensor signals, an ADP processing block 513 configured to determine a respective DOA likelihood vector, i.e., the respective first set of likelihoods of spatial directions for each pair of audio sensors 402$i$, an ambiguity resolution processing block 515 configured to combine the DOA likelihood vectors of all the pairs of audio sensors 402$i$ into a combined DOA likelihood vector and a quantile-based detection processing block 517 configured to determine the third set of likelihoods of spatial directions of the target audio source. Embodiments of these processing blocks and, in particular, the ambiguity resolution processing block 515 will be described in more detail below.

Figure 5:
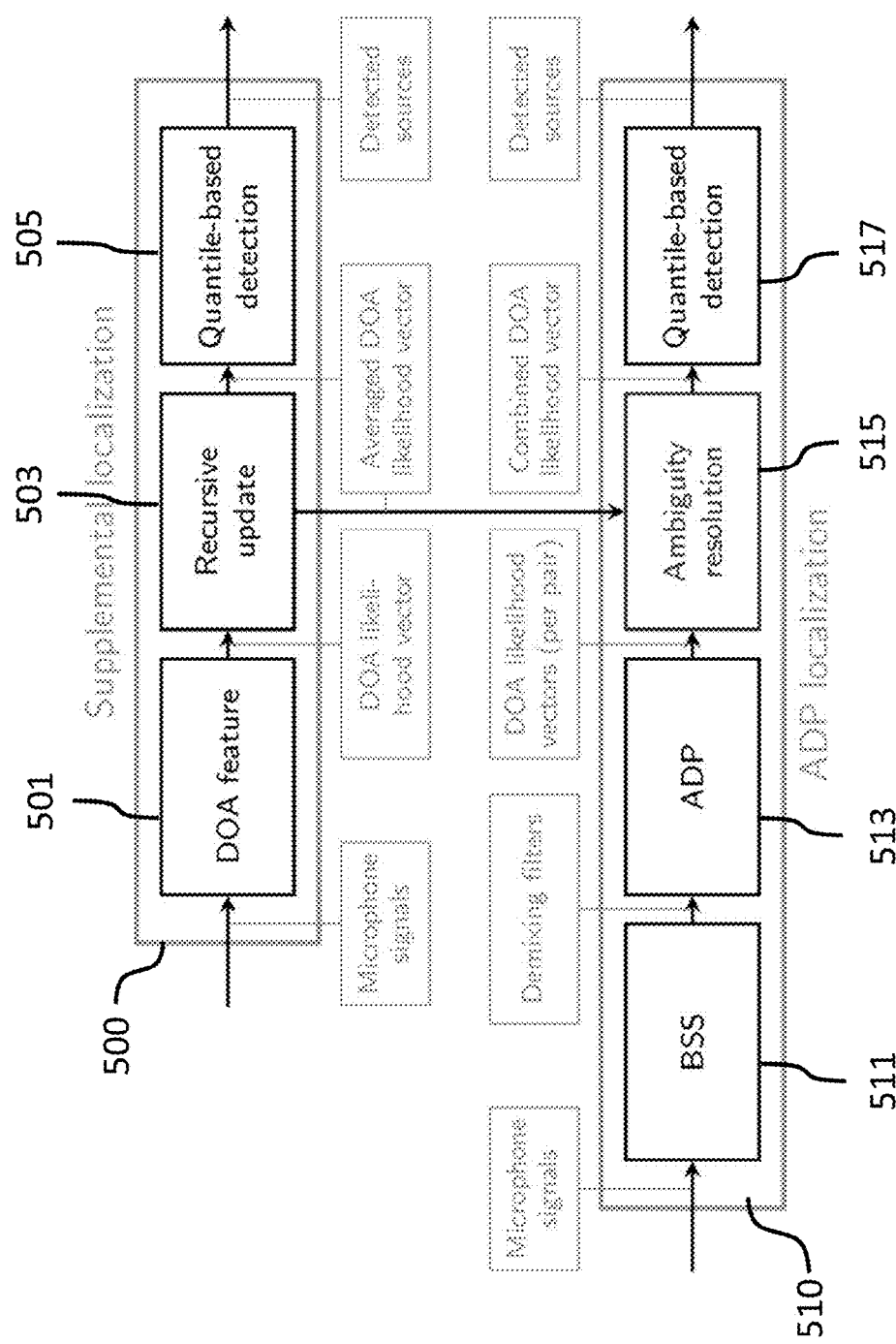
FIG. 5 is a schematic diagram illustrating further aspects of the audio processing apparatus of FIG. 4 according to an embodiment.
Figure 6C:
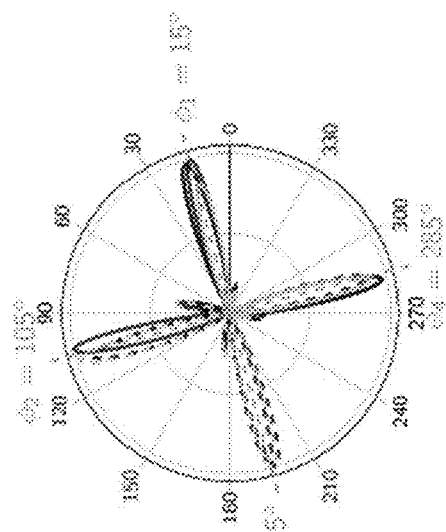
FIGS. 6(a), 6(b) and 6(c) illustrate how the incorporation of supplemental information, as implemented by an audio processing apparatus according to an embodiment, permits distinction between true and "ghost" audio sources.
Figure 6B:
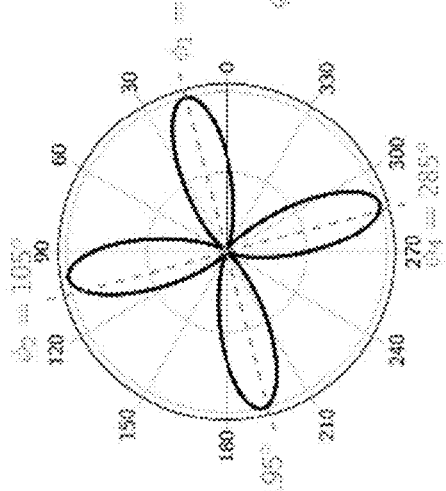
Figure 6A:
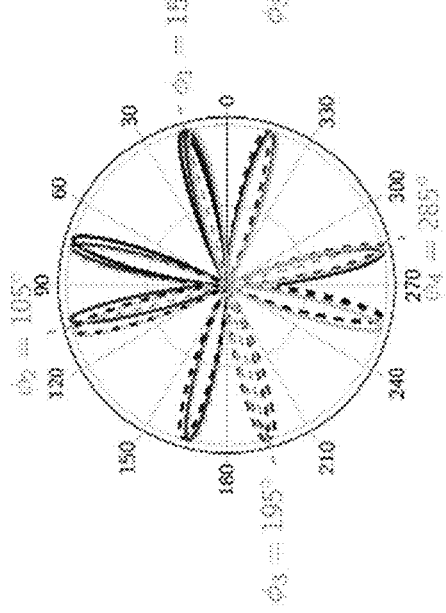

Thus, according to embodiments of the disclosure the front-back ambiguity can be resolved individually per audio sensor pair based on the supplemental localization information (provided by the processing block 510 of FIG. 5) which mitigates the combinatorial explosion of exhaustive search and permits the distinction between true and "ghost" sources as illustrated in FIGS. 6(a), 6(b) and 6(c) while preserving the ability of the ADP processing block 513 to retain detected sources during signal absence periods. By way of example, for four audio sources located at $\phi_1=15°$, $\phi_2=105°$, $\phi_3=195°$ and $\phi_4=285°$ FIG. 6(a) shows the ambiguous pair-wise ADP localization results, FIG. 6(b) shows the supplemental localization results and FIG. 6(c) shows the unambiguous pair-wise ADP localization results before combination over sensor pairs, as provided by embodiments of the disclosure. As will be described in more detail below, according to embodiments of the disclosure a weighted inner product of the DOA likelihood vectors obtained by sampling the ADP localization function, i.e., the first sets of likelihoods of spatial directions, and from the supplemental information, i.e., the second set of likelihoods of spatial directions, is computed, which acts as a local similarity measure between the two vectors. By operating directly on the DOA likelihood vectors, the complication of detecting an unknown, varying number of sources from the DOA likelihood vector as well as solving the data association is avoided. Finally, the accuracy of the supplemental localization illustrated in FIG. 6(b) is non-critical, i.e., ambiguity resolution is still possible for inaccurate peak positions and/or large estimation variance in the supplemental information.

According to embodiments of the disclosure, the audio processing apparatus 400 can utilize a three-stage process comprising the following three main stages, which will be described in more detail further below: (i) determining the sub-array, i.e. audio sensor pair specific DOA likelihood vectors, i.e., first sets of likelihoods of spatial directions of the target audio source by sampling the ADP localization function of each sub-array, (ii) determining the sub-array-specific weights, and (iii) combining the sub-array-specific localization results.

Figure 7:
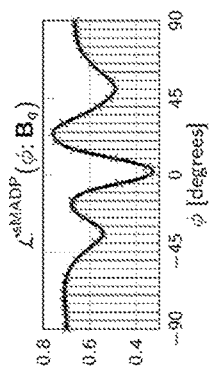
FIGS. 7(a), 7(b) and 7(c) illustrate the computation of pair-wise ADP DOA likelihood vectors as implemented by an audio processing apparatus according to an embodiment.
Figure 7:
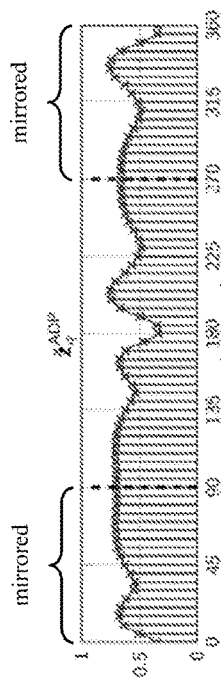
Figure 7:
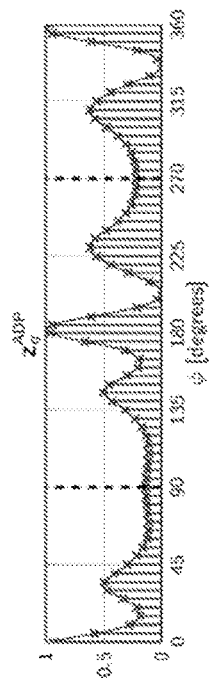

Let $B_q(l)$ denote the demixing system of the q-th BSS unit of the BM 401 of the audio processing apparatus 400 in the l-th time frame. First, the ADP localization function $\mathcal{L}^{sMADP}(\phi; B_q(l))$, shown in FIG. 7(a) is evaluated for a set of $N_Z$ discrete prototype DOAs $\phi_n$, $n \in \{1, \ldots, N_Z\}$, i.e., spatial directions relative to the audio processing apparatus 400 to form the unnormalized "DOA likelihood vector" $\check{z}_q^{ADP}(l)$ depicted in FIG. 7(b), which according to an embodiment may represent the respective first set of likelihoods of spatial directions of the target audio source for the q-th pair or sub-array of audio sensors 402$i$, i.e., the q-th BSS unit of the BM 401:

$$\check{z}_q^{ADP}(l) = [\check{z}_{q,1}^{ADP}(l), \ldots, \check{z}_{q,N_Z}^{ADP}(l)]^T, \tag{1}$$

$$\check{z}_{q,n}^{ADP}(l) = \mathcal{L}^{sMADP}(\phi^n; B_q(l)). \tag{2}$$

A subsequent normalization to the interval [0, 1] according to $$\check{z}_q^{ADP}(l) = \frac{\max_n \check{z}_{q,n}^{ADP}(l) - \check{z}_q^{ADP}(l)}{\max_n \check{z}_{q,n}^{ADP}(l) - \min_n \check{z}_{q,n}^{ADP}(l)} \quad (3)$$

turns minima into maxima as depicted in FIG. 7(c). In contrast to the ADP localization function in FIG. 7(a) where source DOAs were indicated by spatial nulls, i.e., minima of the localization function, the DOA likelihood vector $z_q^{ADP}(l)$, which may represent the respective first set of likelihoods of spatial directions of the target audio source for the q-th pair of audio sensors 402$i$, i.e., the q-th BSS unit of the BM 401 according to a further embodiment, exhibits maxima for the corresponding DOAs.

Figure 8:
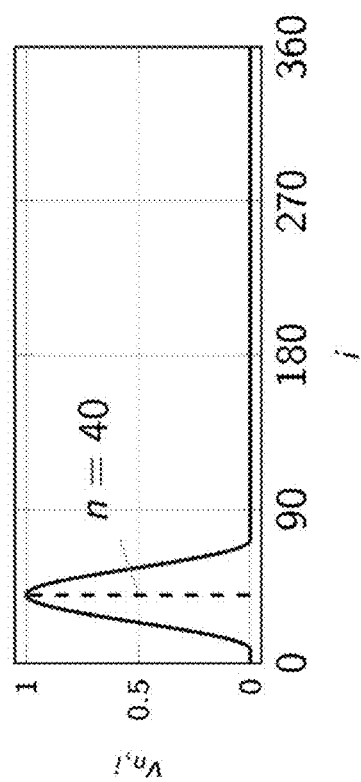
FIG. 8 illustrates an exemplary weight vector based on a von Hann window as used by an audio processing apparatus according to an embodiment.

Given a supplemental DOA likelihood vector, i.e., the second set of likelihoods of spatial directions of the target audio source determined by the second localization scheme $$z(l) = [z_1(l), \ldots, z_{N_Z}(l)]^T, \quad (4)$$

a respective sub-array, i.e., audio sensor pair specific unnormalized weight vector can be computed element-wise by the weighted inner product between $z_q^{ADP}(l)$ in (3) and $z(l)$ in (4):

$$\check{u}_q(l) = [\check{u}_{q,1}(l), \ldots, \check{u}_{q,N_Z}(l)]^T, \quad (5)$$

$$\check{u}_{q,n}(l) = \sum_{i=1}^{N_z} z_i(l) \cdot v_{n,i} \cdot z_{q,i}^{ADP}(l), \quad (6)$$

where $v_{n,i}$ denotes the i-th element of a weight vector, determined by sampling a von Hann window centered on the n-th element corresponding to the n-th sampled spatial direction relative to the audio processing apparatus 400. Intuitively, equation (6) reflects the similarity of $z(l)$ and $z_q^{ADP}(l)$ in a neighborhood around the n-th vector entry, i.e., the n-th sampled spatial direction. An example of $v_{n,i}$ for n=40, $N_Z$=360 is shown in FIG. 8. Thus, according to an embodiment, the processing circuitry of the audio processing apparatus 400 is configured to determine for each pair of audio sensors 402$i$ a set of similarity weights, i.e., the elements of the weight vector $\check{u}_q(l)$, on the basis of the respective audio sensor pair specific DOA likelihood vector $z_q^{ADP}(l)$, i.e., the respective first set of likelihoods, and the supplemental DOA likelihood vector $z(l)$, i.e., the second set of likelihoods. As will be described in the following, according to an embodiment the processing circuitry of the audio processing apparatus 400 is further configured to normalize the weight vector $\check{u}_q(l)$.

Figure 9:
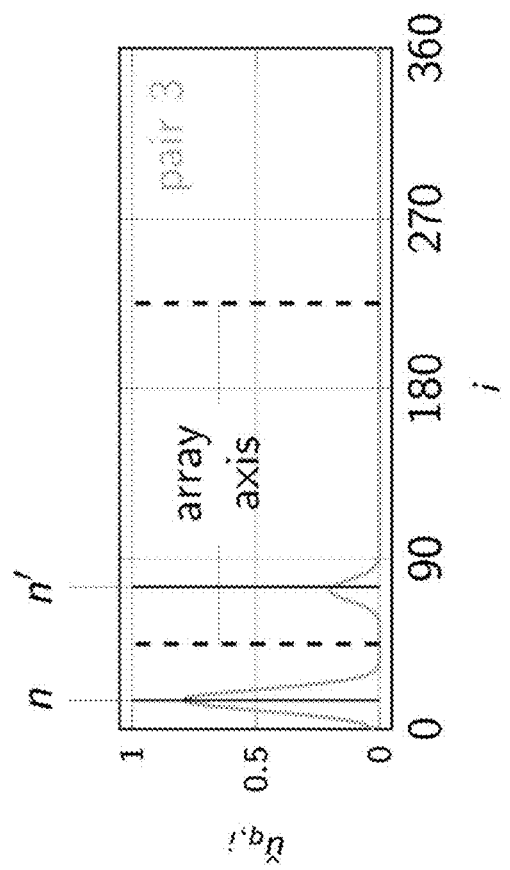
FIG. 9 illustrates an exemplary unnormalized weight vector as used by an audio processing apparatus according to an embodiment.

A subsequent normalization of the weights obtained from equation (6) to the sum of contributions from both half-planes yields the sub-array-specific weight vector $u_q(l)$:

$$u_q(l) = [u_{q,1}(l), \ldots, u_{q,N_Z}(l)]^T, \quad (7)$$

$$u_{q,n}(l) = \frac{\check{u}_{q,n}(l)}{\check{u}_{q,n}(l) + \check{u}_{q,n'}(l)}, \quad (8)$$

where n' denotes the "mirrored" version for a given n, i.e., the prototype DOAs $\phi_n$ and $\phi_{n'}$ lie symmetrically around the mirror axes defined by the endfire directions for each audio sensor pair as illustrated in FIG. 9. For arbitrary audio sensor array geometries and due to the discretized angular range, this relation might not be satisfied exactly, in which case the n' with the closest corresponding $\phi_{n'}$ can be selected. Intuitively, $u_{q,n}(l) \in [0,1]$ thus reflects the fraction of signal power impinging on the array of audio sensors 402$i$ from a specific direction $\phi_n$ in relation to the signal power from all directions producing the same phase difference, which reduces to $\phi_n$ and $\phi_{n'}$ in two-dimensional space. Finally, the weight vector may be applied element-wise to the respective DOA likelihood vector of the q-th audio sensor pair by $$\tilde{z}_q^{ADP}(l) = u_q(l) \odot z_q^{ADP}(l), \quad (9)$$

where $\odot$ denotes the Hadamard (element-wise) product of two vectors. Thus, according to an embodiment, the processing circuitry of the audio processing apparatus 400 is configured for each pair of audio sensors 402$i$ to weight the likelihoods of the respective DOA likelihood vector $z_q^{ADP}(l)$, i.e., the respective first set of likelihoods, with the respective weight vector $u_q(l)$, i.e., the respective set of similarity weights, for obtaining a respective weighted DOA likelihood vector $\tilde{z}_q^{ADP}(l)$, i.e., a respective first set of weighted likelihoods.

In the last step, the weighted DOA likelihood vectors obtained from (9) for the $N_Q$ audio sensor pairs can be combined. While multiple options exist, two efficient choices are a kind of arithmetic mean, i.e., sum operation defined in equation (10) or the Hadamard (element-wise) product operation defined in equation (11):

$$z^{ADP,mean}(l) \propto \sum_{q=1}^{N_Q} \tilde{z}_q^{ADP}(l), \quad (10)$$

$$z^{ADP,prod}(l) \propto \tilde{z}_1^{ADP}(l) \odot \ldots \odot \tilde{z}_{N_Q}^{ADP}(l) \quad (11)$$

Both choices are evaluated in the following. As will be appreciated, equations (10) and (11) may include an arbitrary scaling or normalization factor, which is irrelevant if quantile-based thresholding is employed for the detection of sources, as shown in FIG. 5.

As already described above, the postfilter 411 of the audio processing apparatus 400 shown in FIG. 4 can be a coherent-to-diffuse power ratio based post filter based on a target coherence model and a noise coherence model. According to an embodiment, the processing circuitry of the audio processing apparatus 400 is configured to determine the target coherence model and/or the noise coherence model on the basis of the first sets of likelihoods of spatial directions and the second set of likelihoods of spatial directions of the target audio source and/or the current spatial direction of the target audio source relative to the audio processing apparatus 400.

FIG. 10(a) illustrates an experimental setup for testing the performance of the audio processing apparatus 400 according to an embodiment. In this experimental setup, the audio processing apparatus 400 is implemented as a component of a smartphone lying on a table in a typical office room of dimensions 4.8 m×5.7 m×2.8 m with hard, reflective walls and little furniture. The reverberation time of the room is estimated from several impulse responses to be $T_{60}$=400 ms. A schematic illustration of the smartphone mockup is given in FIG. 10(b). The results below are obtained using a four-microphone configuration consisting of the channels {2, 4, 6, 8} illustrated in FIG. 10(b). The signals have a duration of 65 s including an initial period of 3 s, in which only the target source is active, to obtain an initial position estimate. For the evaluation, up to three simultaneously active point sources are considered. In all scenarios, background noise created by superposition of nine separate speech recordings is added at varying Signal-to-Noise Ratio (SNR) levels ranging from +30 dB to −10 dB. For each recording, a loudspeaker facing away from the target device emitted a different speech signal consisting of utterances taken from the CSR-I (WSJO) corpus (J. Garofalo, D. Graff, D. Paul, and D. Pallett. CSR-I (WSJO) complete. *Linguistic Data Consortium, Philadelphia*, 2007).

A different human speaker (both male and female) and a different set of utterances was chosen for each of the nine signals. Since an accurate estimate of the target source is advantageous for the operation of the audio processing apparatus 400, the following evaluations emphasize localization accuracy over other figures of merit, e.g., the estimated source count. The following localization methods are evaluated: (i) SRP-PHAT; (ii) a multitarget (MT) localization; and (iii) the ADP localization with supplemental information as implemented by the audio processing apparatus 400 according to an embodiment, using SRP-PHAT as supplemental localization.

FIGS. 11(a)-(c) show the detected source DOAs and the target source DOA trajectories for the three investigated localization methods at a fixed $SNR_{log}$=20 dB, namely FIG. 11(a) for SRP-PHAT, FIG. 11(b) for MT and FIG. 11(c) for the ADP localization with supplemental information as implemented by the audio processing apparatus 400 according to an embodiment, using SRP-PHAT as supplemental localization. Evidently, the ADP localization with supplemental information as implemented by the audio processing apparatus 400 according to an embodiment produces less outliers after the convergence phase than both SRP-PHAT and MT and produces a more accurate source DOA trajectory, due to its ability to retain sources during signal absence periods, e.g., speech pauses. This also results in a lower misdetection rate, especially for the target source located at $\phi=0°$.

Figures 12A, 12B:
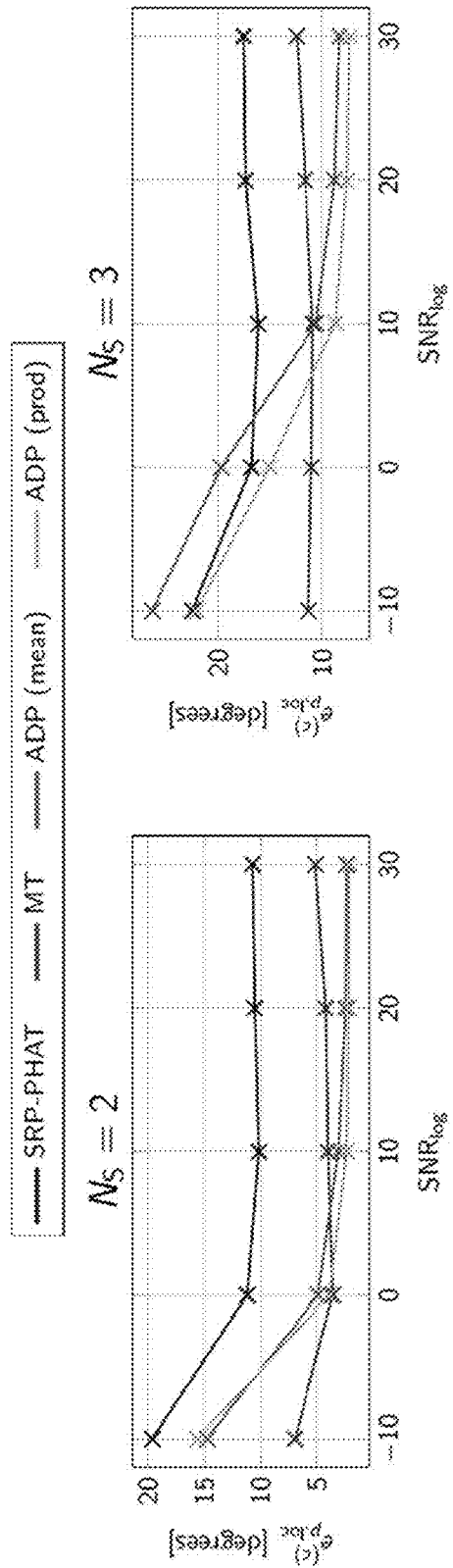
FIGS. 12(a) and 12(b) illustrates further performance results of an audio processing apparatus according to an embodiment.

Optimum Subpattern Assignment (OSPA) is a well-known metric to assess the performance of multi-object filters (D. Schuhmacher, B.-T. Vo, and B.-N. Vo, "A consistent metric for performance evaluation of multi-object filters", *IEEE Transactions on Signal Processing*, 56(8):3447-3457, 2008). In multi-object estimation, the OSPA metric may be interpreted as a per-object error comprised of two components $e_{p,loc}^{(c)}$ and $e_{p,card}^{(c)}$ accounting for localization and cardinality errors respectively. For the following evaluation, the parameters of the OSPA metric are chosen as c=90 (the DOAs are measured in degrees) and p=2. As shown in FIGS. 12(a) and (b), both ADP of the combination options according to above equations (10) and (11) outperform the SRP-PHAT-based MT localization and SRP-PHAT for $SNR_{log}$>10 dB in terms of localization error $e_{p,loc}^{(c)}$. For completeness, the OSPA metric $d_p^{(c)}$ itself and the cardinality error $e_{p,card}^{(c)}$ are provided in the tables shown in FIGS. 13(a) and (b) in addition to the localization error $e_{p,loc}^{(c)}$.

Figure 14:
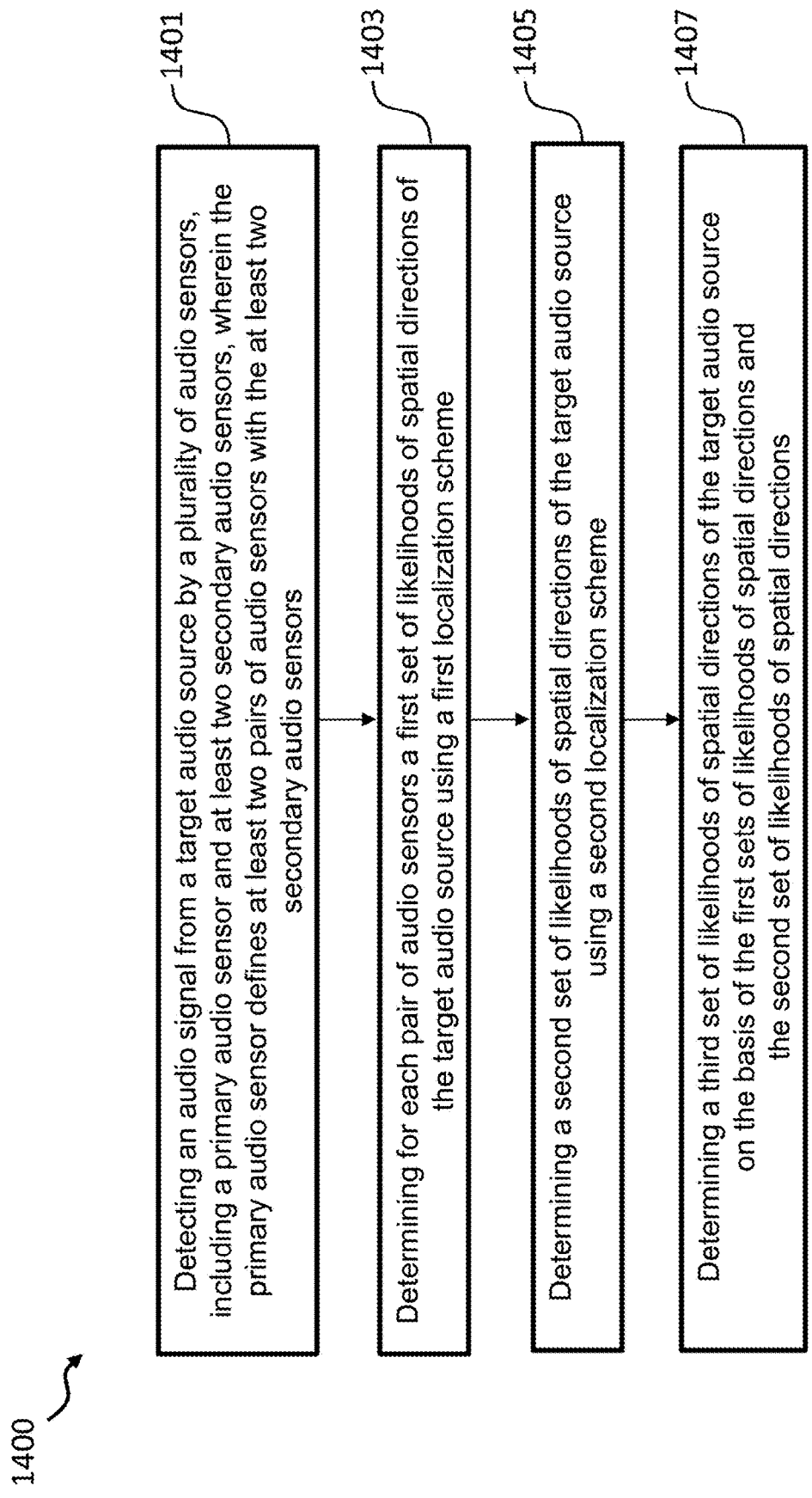
FIG. 14 is a flow diagram showing an example of an audio processing method according to an embodiment of the disclosure.

FIG. 14 is a flow diagram showing an example of an audio processing method 1400 according to an embodiment of the disclosure, which can be implemented by the audio processing apparatus 400 according to an embodiment. The audio processing method 1400 comprises the following steps: detecting 1401 an audio signal from a target audio source by the plurality of audio sensors 402i; determining 1403 for each pair of audio sensors 402i a first set of likelihoods of spatial directions of the target audio source relative to the audio processing apparatus 400 using a first localization scheme; determining 1405 a second set of likelihoods of spatial directions of the target audio source relative to the audio processing apparatus 400 using a second localization scheme; and determining 1407 a third set of likelihoods of spatial directions of the target audio source relative to the audio processing apparatus 400 on the basis of the first sets of likelihoods of spatial directions and the second set of likelihoods of spatial directions.

Embodiments of the disclosure provide an improved accuracy over conventional approaches, e.g., SRP-PHAT. The localization provided by embodiments of the disclosure is essentially independent of instantaneous signal power. Embodiments of the disclosure are capable of handling signal absence periods, e.g., speech pauses. The supplemental information, i.e., the second set of candidate spatial directions of the target source, facilitates distinction between true and "ghost" sources, even in the presence of supplemental localization errors. Embodiments of the disclosure have a reduced computational complexity compared to data association via exhaustive search. Embodiments of the disclosure can be synergistically embedded in conventional GC-TRINICON-based signal extraction front ends.

The processing circuitry may comprise hardware and software. The hardware may comprise analog circuitry or digital circuitry, or both analog and digital circuitry. Digital circuitry may comprise components such as application-specific integrated circuits (ASICs), field-programmable arrays (FPGAs), digital signal processors (DSPs), or general-purpose processors. In one embodiment, the processing circuitry comprises one or more processors and a non-transitory memory connected to the one or more processors. The non-transitory memory may carry executable program code which, when executed by the one or more processors, causes the apparatus to perform the operations or methods described herein.

The person skilled in the art will understand that the "blocks" ("units") of the various figures (method and apparatus) represent or describe functionalities of embodiments of the disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

What is claimed is:

1. An audio processing apparatus, comprising:
a plurality of audio sensors, including a primary audio sensor and at least two secondary audio sensors, configured to detect an audio signal from a target audio source, wherein the primary audio sensor defines at least two pairs of audio sensors with the at least two secondary audio sensors; and
processing circuitry configured to:
determine for each of the at least two pairs of audio sensors a first set of likelihoods of spatial directions of the target audio source using a first localization scheme;
determine a second set of likelihoods of spatial directions of the target audio source using a second localization scheme;
determine a third set of likelihoods of spatial directions of the target audio source on the basis of the first sets of likelihoods of spatial directions and the second set of likelihoods of spatial directions; and
determine for each of the at least two pairs of audio sensors the first set of likelihoods as a first direction-of-arrival, DOA, likelihood vector having a plurality of components and the second set of likelihoods as a second DOA likelihood vector having a plurality of components, wherein the components of the first DOA likelihood vector are defined by the respective value of an averaged directivity pattern, ADP, localization function at a plurality of sampled directions and wherein the components of the second DOA likelihood vector are defined by the respective value of a further localization function at the plurality of sampled directions.

2. The audio processing apparatus of claim 1, wherein the processing circuitry is further configured to determine a current spatial direction of the target audio source on the basis of the third set of likelihoods by determining the most likely spatial direction defined by the third set of likelihoods of spatial directions of the target audio source.

3. The audio processing apparatus of claim 1, wherein the plurality of audio sensors are further configured to detect a further audio signal from at least one further audio source and wherein the processing circuitry is configured to separate the audio signal of the target audio source from the further audio signal of the further audio source using a blind source separation scheme.

4. The audio processing apparatus of claim 3, wherein the processing circuitry is configured to separate the audio signal of the target audio source from the further audio signal of the further audio source using a geometrically constrained triple-n independent component analysis for convolutive mixtures, GC-TRINICON, scheme based on a geometric constraint, wherein the processing circuitry is configured to determine the geometric constraint on the basis of the first sets of likelihoods and the second set of likelihoods and/or the current spatial direction of the target audio source.

5. The audio processing apparatus of claim 3, wherein the processing circuitry is further configured to apply a post filter to the audio signal of the target audio source separated from the further audio signal of the further audio source, wherein the post filter is a coherent-to-diffuse power ratio based post filter based on a target coherence model and/or a noise coherence model wherein the processing circuitry is configured to determine the target coherence model and/or the noise coherence model on the basis of the first sets of likelihoods and the second set of likelihoods and/or the current spatial direction of the target audio source.

6. The audio processing apparatus of claim 1, wherein the first localization scheme is a localization scheme based on a geometrically constrained triple-n independent component analysis for convolutive mixtures, GC-TRINICON, scheme.

7. The audio processing apparatus of claim 1, wherein the second localization scheme is a steered-response power phase transform, SRP-PHAT, scheme.

8. The audio processing apparatus of claim 1, wherein for determining the third set of likelihoods the processing circuitry is configured to determine for each of the at least two pairs of audio sensors a set of similarity weights on the basis of the first set of likelihoods of the respective pair of audio sensors and the second set of likelihoods, wherein each similarity weight of the set of similarity weights represents a similarity measure value between the respective first set of likelihoods and the second set of likelihoods in a respective spatial direction and neighbouring spatial directions thereof.

9. The audio processing apparatus of claim 8, wherein the processing circuitry is configured to determine for a respective pair of audio sensors the respective similarity measure value between the respective first set of likelihoods and the second set of likelihoods in a respective spatial direction and neighbouring spatial directions thereof using a spatial filter centered on the respective spatial direction.

10. The audio processing apparatus of claim 8, wherein for determining the third set of likelihoods the processing circuitry is further configured for each of the at least two pairs of audio sensors to weight the likelihoods of the respective first set of likelihoods with the respective set of similarity weights for obtaining a respective first set of weighted likelihoods.

11. The audio processing apparatus of claim 10, wherein for determining the third set of likelihoods the processing circuitry is further configured to combine the first sets of weighted likelihoods of all of the at least two pairs of audio sensors.

12. The audio processing apparatus of claim 11, wherein the processing circuitry is configured to combine the first sets of weighted likelihoods of all of the at least two pairs of audio sensors by determining a sum of the first sets of weighted likelihoods of all of the at least two pairs of audio sensors or a product of the first sets of weighted likelihoods of all of the at least two pairs of audio sensors.

13. An audio processing method, comprising:
detecting an audio signal from a target audio source by a plurality of audio sensors, including a primary audio sensor and at least two secondary audio sensors, wherein the primary audio sensor defines at least two pairs of audio sensors with the at least two secondary audio sensors;
determining for each of the at least two pairs of audio sensors a first set of likelihoods of spatial directions of the target audio source using a first localization scheme;
determining a second set of likelihoods of spatial directions of the target audio source using a second localization scheme;
determining a third set of likelihoods of spatial directions of the target audio source on the basis of the first sets of likelihoods and the second set of likelihoods; and
determining for each of the at least two pairs of audio sensors the first set of likelihoods as a first direction-of-arrival, DOA, likelihood vector having a plurality of components and the second set of likelihoods as a second DOA likelihood vector having a plurality of components, wherein the components of the first DOA likelihood vector are defined by the respective value of an averaged directivity pattern, ADP, localization function at a plurality of sampled directions and wherein the components of the second DOA likelihood vector are defined by the respective value of a further localization function at the plurality of sampled directions.

14. A non-transitory computer-readable storage medium storing program code which causes a computer or a processor to perform the method of claim 13 when the program code is executed by the computer or the processor, respectively.

15. An audio processing apparatus, comprising:
a plurality of audio sensors, including a primary audio sensor and at least two secondary audio sensors, configured to detect an audio signal from a target audio source, wherein the primary audio sensor defines at least two pairs of audio sensors with the at least two secondary audio sensors; and
processing circuitry configured to:
determine for each of the at least two pairs of audio sensors a first set of likelihoods of spatial directions of the target audio source using a first localization scheme, wherein the first localization scheme is a localization scheme based on a geometrically constrained triple-n independent component analysis for convolutive mixtures, GC-TRINICON, scheme;
determine a second set of likelihoods of spatial directions of the target audio source using a second localization scheme; and
determine a third set of likelihoods of spatial directions of the target audio source on the basis of the first sets of likelihoods of spatial directions and the second set of likelihoods of spatial directions.

16. The audio processing apparatus of claim 15, wherein the second localization scheme is a steered-response power phase transform, SRP-PHAT, scheme.

17. The audio processing apparatus of claim 15, wherein the processing circuitry is further configured to determine a current spatial direction of the target audio source on the basis of the third set of likelihoods by determining the most likely spatial direction defined by the third set of likelihoods of spatial directions of the target audio source.

18. The audio processing apparatus of claim 15, wherein the plurality of audio sensors are further configured to detect a further audio signal from at least one further audio source and wherein the processing circuitry is configured to separate the audio signal of the target audio source from the further audio signal of the further audio source using a blind source separation scheme.

19. The audio processing apparatus of claim 15, wherein for determining the third set of likelihoods the processing circuitry is configured to determine for each of the at least two pairs of audio sensors a set of similarity weights on the basis of the first set of likelihoods of the respective pair of audio sensors and the second set of likelihoods, wherein each similarity weight of the set of similarity weights represents a similarity measure value between the respective first set of likelihoods and the second set of likelihoods in a respective spatial direction and neighbouring spatial directions thereof.

* * * * *